(12) United States Patent
Dhanabalan et al.

(10) Patent No.: US 11,898,025 B2
(45) Date of Patent: Feb. 13, 2024

(54) POLYETHYLENE WITH ADDITIVES FOR INCREASED ENVIRONMENTAL STRESS CRACK RESISTANCE

(71) Applicant: SABIC GLOBAL TECHNOLOGIES B.V., Bergen op Zoom (NL)

(72) Inventors: Anantharaman Dhanabalan, Geleen (NL); Shaneesh Vadake Kulangara, Geleen (NL); Maria Soliman, Geleen (NL); Radha Kamalakaran, Geleen (NL); Anshita Sudarshan, Geleen (NL); Sadasivam Gopalakrishnan, Geleen (NL); Anirban Ganguly, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 297 days.

(21) Appl. No.: 17/291,037

(22) PCT Filed: Nov. 4, 2019

(86) PCT No.: PCT/EP2019/080063
§ 371 (c)(1),
(2) Date: May 4, 2021

(87) PCT Pub. No.: WO2020/094553
PCT Pub. Date: May 14, 2020

(65) Prior Publication Data
US 2021/0388189 A1   Dec. 16, 2021

Related U.S. Application Data

(60) Provisional application No. 62/760,502, filed on Nov. 13, 2018.

(30) Foreign Application Priority Data

Nov. 5, 2018   (IN) .............................. 201841041746

(51) Int. Cl.
| | | |
|---|---|---|
| C08L 23/06 | (2006.01) | |
| C08G 77/448 | (2006.01) | |
| C08L 83/10 | (2006.01) | |

(52) U.S. Cl.
CPC ............ C08L 23/06 (2013.01); C08G 77/448 (2013.01); C08L 83/10 (2013.01); *C08L 2207/062* (2013.01)

(58) Field of Classification Search
CPC ......................... C08G 64/186; C08L 2207/062
See application file for complete search history.

(56) References Cited

U.S. PATENT DOCUMENTS

| | | | |
|---|---|---|---|
| 4,409,410 A * | 10/1983 | Cosyns | ..................... C07C 5/03 585/843 |
| 4,616,064 A | 10/1986 | Zukosky et al. | |
| 7,365,124 B2 | 4/2008 | Srinivasan et al. | |
| 7,569,175 B1 * | 8/2009 | Nilsen | ................. B29C 49/0005 525/240 |
| 2008/0103260 A1 | 5/2008 | Lee et al. | |
| 2015/0307679 A1 | 10/2015 | Lee | |
| 2015/0315401 A1 * | 11/2015 | Lee | .......................... C08K 3/04 385/100 |
| 2016/0030974 A1 * | 2/2016 | Kang | ................. B01D 67/0083 427/171 |
| 2021/0221986 A1 | 7/2021 | Dhanabalan | |
| 2021/0238370 A1 * | 8/2021 | Pujari | ..................... C08L 23/06 |

FOREIGN PATENT DOCUMENTS

| | | | |
|---|---|---|---|
| CA | 2752407 | * | 3/2013 |
| JP | H06287429 | * | 10/1994 |
| WO | 2014099360 A1 | | 6/2014 |
| WO | WO 2018033637 | * | 2/2018 |
| WO | 2019206965 A1 | | 10/2019 |
| WO | 2019228783 A1 | | 12/2019 |
| WO | 2019233702 A1 | | 12/2019 |

OTHER PUBLICATIONS

Schopges et al., electronic translation of WO 2018/033637, Feb. 2018.*
Okamoto et al., electronic translation of JP H06287429, Oct. 1994.*
International Search Report for International Application No. PCT/EP2019/080063, International Filing Date Nov. 4, 2019, dated Mar. 27, 2020, 8 pages.
Written Opinion for International Application No. PCT/EP2019/080063, International Filing Date Nov. 4, 2019, dated Mar. 27, 2020, 11 pages.
Llenda CS: "Modification of polycarbonate by a crystalline polyolefin and a graft copolymer (CS Llenda, Rohm and Haas Company)", Research Disclosure Kenneth Mason Publications, Hampshire, UKK, GB, vol. 339, No. 52, Jul. 1, 1992 (Jul. 1, 1992), XP007117913, ISSN: 0374-4353.

* cited by examiner

*Primary Examiner* — Jeffrey C Mullis
(74) *Attorney, Agent, or Firm* — CANTOR COLBURN LLP

(57) ABSTRACT

A polyethylene composition having increased environmental stress crack resistance comprises a polymer blend of a multimodal high density polyethylene (HDPE) and an additive of at least one of a polycarbonate-siloxane copolymer, a polyethylene glycol (PEG) having an average molecular weight (Mw) of at least 2000, and a random block copolymer comprising two different saturated alkane blocks between two aromatic hydrocarbon blocks. The additive is present in the polymer blend in an amount of from 1 wt. % or less by weight of the polymer blend.

16 Claims, No Drawings

POLYETHYLENE WITH ADDITIVES FOR INCREASED ENVIRONMENTAL STRESS CRACK RESISTANCE

CROSS REFERENCE TO RELATED APPLICATIONS

This application is a National Stage application of PCT/EP2019/080063, filed Nov. 4, 2019, which claims the benefit of U.S. Provisional Application No. 62/760,502, filed Nov. 13, 2018, and Indian Application No. 201841041746, filed Nov. 5, 2018.

TECHNICAL FIELD

The invention relates to high density polyethylene compositions that have improved environmental stress crack resistance.

BACKGROUND

Synthetic polymeric materials, particularly thermoplastic resins, are widely used in the manufacturing of a variety of end-use articles ranging from medical devices to food containers. Conventional propylene based polymeric materials have long been used in processes like thermoforming, blow molding, coating, etc., requiring high melt strength which could be achieved by increasing molecular weight and broadening of molecular weight distribution. Molecular weight and molecular weight distribution can be modified in the polymerization process itself by choosing particular process conditions and catalysts.

Polypropylene (PP) has widely been used to produce caps and closures. To achieve a necessary cap strength, however, an inner liner (e.g., made from ethylene vinyl acetate (EVA), polyvinylchloride (PVC), butyl rubber, or the like) is typically required to achieve the requisite seal properties and organoleptic properties. Such two-layer caps are costly. On the other hand, high density polyethylene (HDPE) typically possesses requisite stiffness, flow properties, and better organoleptic properties for making one-piece closures, such as screw caps. HDPE, however, mostly lacks in its ability to resist cracking over time (as measured by environmental stress cracking resistance (ESCR) testing). Hence, there is a need to improve ESCR performance of HDPE compositions.

Attempts have been made to improve such performance. While various methods exist to increase ESCR properties of polyethylene, many of these suffer in that they are cost prohibitive or applicable only to the method of making the starting polyethylene materials instead of to existing polyethylene materials. These include the incorporation of $C_4$, $C_6$, and/or $C_8$ comonomers used during polymerization, which may be carried out in the vapor phase or in solution. Fine-tuning the molecular weight distribution (bi- or multimodal) has also been used, as well as blending the polyethylene with other polymers. Cross-linking of silane grafted of polyethylene, use of specific nucleating agents, and the use of specific catalyst packages have also been used.

While the use of different additives have also been used, these additives have typically been used at high concentrations. Such high concentrations of additives worsen the flow and mechanical properties of the resulting polymers, as well as increase the costs associated with their manufacture, making their use commercially impractical.

Given the growing trend of down-gauging of the plastic parts (for example, caps and closure, bottles and containers) and the use of plastic containers for storing aggressive chemicals (bleach bottles), an enhanced ESCR performance of plastics even at a lower thickness becomes more vital. For instance, a weight reduction of bottle caps from 3 g to 1.8-2.0 g, as currently demanded by many brand-owners, while still keeping its ESCR performance, is an emerging challenge. There is therefore a continuing need for improved polyethylene-based compositions having increased ESCR, particularly for those that are suitable for cap and closure applications.

SUMMARY

A polyethylene composition having increased environmental stress crack resistance comprises a polymer blend of a multimodal high density polyethylene (HDPE) and an additive that includes at least one of a polycarbonate-siloxane copolymer, a polyethylene glycol (PEG) having an average molecular weight (Mw) of at least 2000, and a random block copolymer comprising two different saturated alkane blocks between two aromatic hydrocarbon blocks. The additive is present in the polymer blend in an amount of from 1 wt. % or less by weight of the polymer blend.

In particular embodiments, the additive comprises at least two of a polycarbonate-siloxane copolymer, a polyethylene glycol (PEG), and a random block copolymer comprising two different saturated alkane blocks between two aromatic hydrocarbon blocks. The additive may be present in an amount of from 0.1 wt. % to 1 wt. % by weight of the polymer blend in certain instances. In other instances, the additive is present in an amount of from 0.1 wt. % to 0.5 wt. % by weight of the polymer blend.

The HDPE may have a melt flow ratio at 190° C. and 2.16 kg of from 0.3 to 6.0; a melt flow ratio at 190° C. and 21.6 kg of 3 dg/min to 70 dg/min; and/or a density of 945 kg/m$^3$ to 965 kg/m$^3$. The density may be determined in accordance with ASTM D792 (2013). The melt flow ratio (MFR) may be determined in accordance with ISO 1133-1 (2011). In particular embodiments, the HDPE may have a dispersity index (PDI=Mw/Mn) of from 8 to 30 as determined by gel permeation chromatography. In certain instances, the HDPE is a copolymer with comonomers selected from $C_3$ to $C_{10}$ olefin monomers, the comonomers being present in the HDPE copolymer in an amount of from 2 wt. % or less.

The polymer blend may provide a molded article having an ESCR of at least 40 hours as determined by ASTM D1693-15B. In certain instances, the polymer blend provides a molded article having an ESCR of from 30 hours to 1000 hours as determined by ASTM D1693-15B.

In particular embodiments, the additive is a polycarbonate-siloxane copolymer. The polycarbonate-siloxane copolymer may have an average molecular weight (Mw) of from 10,000 to 60,000 and/or the polycarbonate component may comprise a bisphenol-A polycarbonate. The polycarbonate-siloxane copolymer may also be a bisphenol-A and eugenol end-capped siloxane copolymer. The siloxane of the polycarbonate-siloxane copolymer may have a chain length of from 5 to 65 siloxane repeating units in certain embodiments.

The additive is a polyethylene glycol (PEG) in some embodiments. The PEG may have an average molecular weight (Mw) of from 2,000 to 40,000. In certain cases, the PEG may have an average molecular weight (Mw) of from 5000 to 20,000.

In particular applications, the additive is a random block copolymer comprising two different saturated alkane blocks between two aromatic hydrocarbon blocks. The random block copolymer may have at least one of the two different saturated alkane blocks that are branched. The random block copolymer may be a styrenic-(2-methyl butane)-butane-styrenic random block copolymer in some instances. The random block copolymer may have an average molecular weight of from 250,000 to 450,000 as per polystyrene standard and a dispersity index (PDI=Mw/Mn) of from 0.9 to 1.2 as determined by gel permeation chromatography. In some cases, the random block copolymer is a hydrogenated styrene-isoprene-butane block polymer.

The polyethylene composition may further include an additional additive of at least one of a nucleating agent, a heat conductive agent, a tie agent, an antiblocking agent, an antistatic agent, an antioxidant, a neutralizing agent, an acid scavenger, a blowing agent, a crystallization aid, a dye, a flame retardant agent, a filler, an impact modifier, a mold release agent, an oil, another polymer, a pigment, a processing agent, a reinforcing agent, a stabilizer, an UV resistance agent, a clarifying agent, a slip agent, a flow modifying agent, ionic additive and combinations thereof.

The polymer blend may be formed into an article of manufacture. The article may be a film, a molded part, a container, a beverage container cap, a lid, a sheet, a pipe, a pipe coupling, a bottle, a cup, a tray, a pallet, and/or a toy. The article may be formed by at least one of injection molding, blow molding, compression molding, sheet extrusion, film blowing, pipe extrusion, profile extrusion, calendaring, and thermoforming.

In a method of forming a polyethylene composition having increased environmental stress crack resistance, a multimodal high density polyethylene (HDPE) is modified by combining the multimodal HDPE with an additive of at least one of a polycarbonate-siloxane copolymer, a polyethylene glycol (PEG) having an average molecular weight (Mw) of at least 2000, and a random block copolymer comprising two different saturated alkane blocks between two aromatic hydrocarbon blocks, the additive being present in the polymer blend in an amount of from 1 wt. % or less by weight of the polymer blend.

DETAILED DESCRIPTION

It has been discovered that the environmental stress crack resistance (ESCR) of high density polyethylene (HDPE) can be increased by incorporating various additives at low concentrations. These additives are incorporated into a multimodal HDPE by polymer melt blending the additives with the multimodal HDPE. The amount and the type of the additives incorporated into the multimodal HDPE is selected so that the processability of the HDPE remains relatively unaffected while its ESCR performance is enhanced.

The HDPE polymers used in the polymer blend can include those prepared by any of the polymerization processes, which are in commercial use (e.g., a "high pressure" process, a slurry process, a solution process and/or a gas phase process) and with the use of any of the known catalysts (e.g., multisite catalysts such as Ziegler Natta catalysts, and/or single site catalysts such as chromium or Phillips catalysts, metallocene catalysts, and the like).

The HDPE is a multimodal HDPE with or without some amount of unimodal or bimodal HDPE. As used herein, where the phrase or term "high density polyethylene" or "HDPE" are used without characterization as unimodal, bimodal or multimodal HDPE, the phrase or term should be construed as referring to multimodal HDPE, with or without some amount of unimodal and/or bimodal HDPE. Bimodal/multimodal HDPE can be produced by the use of two or more reactor connected in series using transition metal catalysts. Such multimodal HDPE composition contains the reactor blend of 35-65 wt % of ethylene homopolymer with density>960 kg/m3 & 65-35 wt % of ethylene copolymers produced in one more reactors. The HDPE can be obtained from a commercial vendor. Unimodal/Multimodal HDPE possesses varying Mw/Mn which ranges from 6 to 30, and comonomer content which ranges from 0.4 to 2.0 wt %.

The HDPE can be characterized by various properties such as the melt flow rates (MFR) at 190° C. and 2.16 kg and/or 21.6 kg, a density, ESCR, tensile strength at yield tensile modulus, tensile elongation at yield, Charpy notched impact strength (−30° C.), hardness or combinations thereof. The density of the unimodal, bimodal or multimodal HDPE can be from 945 kg/m$^3$ to 965 kg/m$^3$, or at least, equal to, and/or between any two of 945 kg/m', 950 kg/m$^3$, 955 kg/m$^3$, 960 kg/m$^3$, and 965 kg/m$^3$.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

All or a major portion of the HDPE component is multimodal HDPE. The multimodal HDPE may make up from 50 wt. % or greater than 50 wt. % to 100 wt. % of the HDPE component. In particular embodiments, the HDPE component may comprise multimodal HDPE in an amount of from at least, equal to, and/or between any two of 50 wt. %, 51 wt. %, 52 wt. %, 53 wt. %, 54 wt. %, 55 wt. %, 56 wt. %, 57 wt. %, 58 wt. %, 59 wt. %, 60 wt. %, 61 wt. %, 62 wt. %, 63 wt. %, 64 wt. %, 65 wt. %, 66 wt. %, 67 wt. %, 68 wt. %, 69 wt. %, 70 wt. %, 71 wt. %, 72 wt. %, 73 wt. %, 74 wt. %, 75 wt. %, 76 wt. %, 77 wt. %, 78 wt. %, 79 wt. %, 80 wt. %, 81 wt. %, 82 wt. %, 83 wt. %, 84 wt. %, 85 wt. %, 86 wt. %, 87 wt. %, 88 wt. %, 89 wt. %, 90 wt. %, 91 wt. %, 92 wt. %, 93 wt. %, 94 wt. %, 95 wt. %, 96 wt. %, 97 wt. %, 98 wt. %, 99 wt. %, and 100 wt. %. In particular embodiments, the HDPE component may comprise multimodal HDPE in an amount of from 80 wt. % to 100 wt. %. If less than 100 wt. % of multimodal HDPE is used for the HDPE component, the remainder may be made up of unimodal and/or bimodal HDPE, and/or a non-HDPE polyethylene, such as low density polyethylene (LDPE), linear low density polyethylene (LLDPE), and medium density polyethylene (MDPE). In some embodiments, the polymer blends do not include linear low density polyethylene (LLDPE). In certain aspects, the polymer blends of the present invention do not include polypropylene.

The multimodal HDPE can have a MFR at 190° C. and 2.16 kg of from 0.2 dg/min to 1.0 dg/min or at least, equal to, and/or between any two of 0.2 dg/min to 1.0 dg/min or at least, equal to, and/or between any two of 0.2 dg/min, 0.3 dg/min, 0.4 dg/min, 0.5 dg/min, 0.6 dg/min, 0.7 dg/min, 0.8 dg/min, 0.9 dg/min, and 1.0 dg/min. In particular embodiments, the multimodal HDPE can have a MFR at 190° C.

and 2.16 kg of from 0.3 dg/min to 0.6 dg/min. The multimodal HDPE can also have a MFR at 190° C. and 21.6 kg of from 2 dg/min to 40 dg/min or at least, equal to, and/or between any two of 2 dg/min, 3 dg/min, 4 dg/min, 5 dg/min, 6 dg/min, 7 dg/min, 8 dg/min, 9 dg/min, 10 dg/min, 11 dg/min, 12 dg/min, 13 dg/min, 14 dg/min, 15 dg/min, 16 dg/min, 17 dg/min, 18 dg/min, 19 dg/min, 20 dg/min, 21 dg/min, 22 dg/min, 23 dg/min, 24 dg/min, 25 dg/min, 26 dg/min, 27 dg/min, 28 dg/min, 29 dg/min, 30 dg, min, 31 dg/min, 32 dg/min, 33 dg/min, 34 dg/min, 35 dg/min, 36 dg/min, 37 dg/min, 38 dg/min, 39 dg/min and 40 dg/min, In particular embodiments, the MFR at 190° C. and 21.6 kg is from 3 dg/min to 35 dg/min.

The multimodal HDPE of the HDPE component may have a dispersity index (PDI=Mw/Mn) of from 8 to 30 as determined by gel permeation chromatography.

If some amount of bimodal HDPE is used, it may range from greater than 0 wt. % to 50 wt. % or less than 50 wt. % by total weight of the polymer blend. In particular embodiments, the bimodal HDPE of the HDPE component may comprise bimodal HDPE in an amount of from at least, equal to, and/or between any two of 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, and 50 wt. % by total weight of the polymer blend.

The bimodal HDPE can have a MFR at 190° C. and 2.16 kg and/or 21 kg of from 0.2 dg/min to 20 dg/min or at least, equal to, and/or between any two of 0.2 dg/min to 20 dg/min or at least, equal to, and/or between any two of 0.2 dg/min, 0.3 dg/min, 0.4 dg/min, 0.5 dg/min, 0.75 dg/min, 1 dg/min, 1.25 dg/min, 1.5 dg/min, 1.75 dg/min, 2 dg/min, 3 dg/min, 4 dg/min, and 5 dg/min, 6 dg/min, 7 dg/min, 8 dg/min, 9 dg/min, 10 dg/min, 11 dg/min, 12 dg/min, 13 dg/min, 14 dg/min, 15 dg/min, 16 dg/min, 17 dg/min, 18 dg/min, 19 dg/min, and 20 dg/min, 21 dg/min, 22 dg/min, 23 dg/min, 24 dg/min, 25 dg/min, 26 dg/min, 27 dg/min, 28 dg/min, 29 dg/min, 30 dg/min, 31 dg/min, 32 dg/min, 33 dg/min, 34 dg/min, 35 dg/min, 36 dg/min, 37 dg/min, 38 dg/min, 39 dg/min, 40 dg/min. 41 dg/min, 42 dg/min, 43 dg/min, 44 dg/min, 45 dg/min, 46 dg/min, 47 dg/min, 48 dg/min, 49 dg/min and 50 dg/min. In particular embodiments, the MFR is from 0.5 dg/min to 5 dg/min at 190° C. and with a 2.16 kg load.

Tensile modulus of bimodal or multimodal HDPE can be from 850 MPa to 1300 MPa, or at least, equal to, and/or between any two of 850 MPa, 900 MPa, 950 MPa, 1000 MPa, 1050 MPa, 1100 MPa, 1150 MPa, 1200 MPa, 1250 MPa and 1300 MPa, as measured by ASTM D638. Tensile strength at yield of bimodal and multimodal HDPE can be from 20 MPa to 40 MPa, or at least, equal to, and/or between any two of 20 MPa, 25 MPa, 30 MPa, 35 MPa, and 40 MPa, as measured by ASTM D638.

The Charpy notched impact strength of the bimodal or multimodal HDPE component at −30° C. can be from 3 $kJ/m^2$ to 6 $kJ/m^2$ or at least, equal to, and/or between any two of 3 $kJ/m^2$, 4 $kJ/m^2$, 5 $kJ/m^2$, and 6 $kJ/m^2$. The Charpy notched impact strength of the bimodal or multimodal HDPE component at 23° C. can be from 14 $kJ/m^2$ to 22 $kJ/m^2$ or at least, equal to, and/or between any two of 14 $kJ/m^2$, 15 $kJ/m^2$, 16 $kJ/m^2$, 17 $kJ/m^2$, 18 $kJ/m^2$, 19 $kJ/m^2$, 20 $kJ/m^2$, 21 $kJ/m^2$ and 22 $kJ/m^2$. The izod notched impact strength of the HDPE component at 23° C. can be from 5 $kJ/m^2$-20 $kJ/m^2$ or at least, equal to, and/or between any two of 5 $kJ/m^2$, 6 $kJ/m^2$, 7 $kJ/m^2$, 8 $kJ/m^2$, 9 $kJ/m^2$, 10 $kJ/m^2$, 11 $kJ/m^2$, 12 $kJ/m^2$, 13 $kJ/m^2$, 14 $kJ/m^2$, 15 $kJ/m^2$, 16 $kJ/m^2$, 17 $kJ/m^2$, 18 $kJ/m^2$, 19 $kJ/m^2$ and 20 $kJ/m^2$.

In some embodiments, a portion of the HDPE component may be unimodal. If a unimodal HDPE is used it may range from greater than 0 wt. % to 50 wt. % or less than 50 wt. % by total weight of the polymer blend. In particular embodiments, the unimodal HDPE of the HDPE component may comprise unimodal HDPE in an amount of from at least, equal to, and/or between any two of 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, and 50 wt. % by total weight of the polymer blend.

The unimodal HDPE can have a MFR at 190° C. and 2.16 kg and/or 21.6 kg that ranges from 0.2 dg/min to 50 dg/min or at least, equal to, and/or between any two of 0.2 dg/min, 0.3 dg/min, 0.4 dg/min, 0.5 dg/min, 0.75 dg/min, 1 dg/min, 1.25 dg/min, 1.5 dg/min, 1.75 dg/min, 2 dg/min, 3 dg/min, 4 dg/min, and 5 dg/min, 6 dg/min, 7 dg/min, 8 dg/min, 9 dg/min, 10 dg/min, 11 dg/min, 12 dg/min, 13 dg/min, 14 dg/min, 15 dg/min, 16 dg/min, 17 dg/min, 18 dg/min, 19 dg/min, and 20 dg/min, 21 dg/min, 22 dg/min, 23 dg/min, 24 dg/min, 25 dg/min, 26 dg/min, 27 dg/min, 28 dg/min, 29 dg/min, 30 dg/min, 31 dg/min, 32 dg/min, 33 dg/min, 34 dg/min, 35 dg/min, 36 dg/min, 37 dg/min, 38 dg/min, 39 dg/min, 40 dg/min. 41 dg/min, 42 dg/min, 43 dg/min, 44 dg/min, 45 dg/min, 46 dg/min, 47 dg/min, 48 dg/min, 49 dg/min and 50 dg/min. In particular embodiments, the MFR is from 0.5 dg/min to 5 dg/min at 190° C. and with a 2.16 kg load.

Tensile modulus and/or flexural modulus of unimodal HDPE can be from 850 MPa to 1300 MPa, or at least, equal to, and/or between any two of 850 MPa, 900 MPa, 950 MPa, 1000 MPa, 1050 MPa, 1100 MPa, 1150 MPa, 1200 MPa, 1250 MPa, and 1300 MPa, as measured by ISO 527-2. Tensile and/or flexural strength at yield of unimodal HDPE can be from 20 MPa to 40 MPa, or at least, equal to, and/or between any two of 20 MPa, 25 MPa, 30 MPa, 35 MPa, and 40 MPa, as measured by ISO 527-2.

The Charpy notched impact strength of the unimodal HDPE component at −30° C. can be from 3 $kJ/m^2$ to 6 $kJ/m^2$ or at least, equal to, and/or between any two of 3 $kJ/m^2$, 4 $kJ/m^2$, 5 $kJ/m^2$, and 6 $kJ/m^2$. The izod notched impact strength of the HDPE component at 23° C. can be from 5 $kJ/m^2$-20 $kJ/m^2$ or at least, equal to, and/or between any two of 5 $kJ/m^2$, 6 $kJ/m^2$, 7 $kJ/m^2$, 8 $kJ/m^2$, 9 $kJ/m^2$, 10 $kJ/m^2$, 11 $kJ/m^2$, 12 $kJ/m^2$, 13 $kJ/m^2$, 14 $kJ/m^2$, 15 $kJ/m^2$, 16 $kJ/m^2$, 17 $kJ/m^2$, 18 $kJ/m^2$, 19 $kJ/m^2$ and 20 $kJ/m^2$.

In certain embodiments, the HDPE component of the polymer blend will constitute homopolymers of ethylene. These may include homopolymers solely of neat HDPE. In other embodiments, however, the HDPE component may include a polymer blend with non-HDPE polyethylene. These may include low density polyethylene (LDPE), linear low density polyethylene (LLDPE), and medium density polyethylene (MDPE). When such non-HDPE polyethylene is used it may be present in the HDPE polymer component in an amount of from 2 wt. %, 1.5 wt. %, 1 wt. %, 0.5 wt. %, 0.1 wt. % or less.

In other embodiments, the HDPE component can include copolymers of ethylene with at least one $C_3$ to $C_{10}$ alpha olefin. Typically, this will be at least one of the alpha olefins of butene, hexene, and/or octene. In some embodiments the HDPE is a copolymer with 1-butene (polyethylene-1-butene) or 1-hexene (polyethylene-1-hexene). When such copolymers are used, the non-ethylene comonomer may be present in the HDPE copolymer in an amount of from 2 wt. %, 1.5 wt. %, 1 wt. %, 0.5 wt. %, 0.1 wt. % or less. In particular embodiments, there is no butene or no $C_3$ to $C_{10}$ alpha olefin comonomer. Those amount percentages of multimodal HDPE, bimodal HDPE, and/or unimodal HDPE presented previously for the HDPE component may include such HDPE incorporating such copolymers.

In certain embodiments, the HDPE may be an un-functionalized neat HDPE with no functional groups along the polymer chain. In particular embodiments, the HDPE polyethylene does not include any anhydride modified HDPE.

The HDPE component, as described above, is used as a polymer blend in combination with one or more different primary additives used to provide the increased environmental stress crack resistance. These primary additives may include one or more of a polycarbonate-siloxane copolymer, a polyethylene glycol (PEG) having an average molecular weight (Mw) of at least 2000, and a random block copolymer comprising two different saturated alkane blocks between two aromatic hydrocarbon blocks. Such primary additives may be present in the polymer blend in a total amount of from 1 wt. % or less by total weight of the polymer blend. In particular embodiments, the total amount of primary additives may be at least, equal to, and/or between any two of 0.10 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.20 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.30 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.40 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.50 wt. %, 0.55 wt. %, 0.60 wt. %, 0.65 wt. %, 0.70 wt. %, 0.75 wt. %, 0.80 wt. %, 0.85 wt. %, 0.90 wt. %, 0.95 wt. %, and 1.00 wt. % by total weight of the polymer blend. In particular embodiments, the above-described additives are present in the polymer blend in a total amount of from 0.10 wt. % to 0.60 wt. % by total weight of the polymer blend. These additives are typically combined with the HDPE component by polymer melt blending.

In certain embodiments, the HDPE component, as described above, may be used as a polymer blend in combination with a polycarbonate-siloxane copolymer. The polycarbonate-siloxane copolymer may be used as the primary additive alone as the sole primary additive or in combination with one or more of the other primary additives. In other embodiments, one or more of the other primary additives are used with no polycarbonate-siloxane copolymer being used. The polycarbonate-siloxane copolymer and its incorporation as a polymer blend with the HDPE component may the same or similar to that described in U.S. Patent Application No. 62/677,319, filed May 29, 2018, which is incorporated herein by reference for all purposes.

To impart the desired ESCR characteristics of the final product, the polycarbonate-siloxane copolymer may be used in an amount of from amount of from 1 wt. % or less by total weight of the polymer blend or at least, equal to, and/or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.10 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.20 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.30 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.40 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.50 wt. %, 0.55 wt. %, 0.60 wt. %, 0.65 wt. %, 0.70 wt. %, 0.75 wt. %, 0.80 wt. %, 0.85 wt. %, 0.90 wt. %, 0.95 wt. %, and 1.0 wt. % by total weight of the polymer blend. In particular embodiments, the polycarbonate-siloxane copolymer additive may be present in the polymer blend in an amount of from 0.01 wt. % to 0.5 wt. %. by total weight of the polymer blend.

The polycarbonate siloxane copolymer component of the polymer blend may have an average molecular weight (Mw) of from 10,000 to 60,000 or at least, equal to, and/or between any two molecular weights of 10,000, 15,000, 20,000, 25,000, 30,000, 35,000, 40,000, 45,000, 50,000, 55,000, and 60,000. The polycarbonate component of the polycarbonate-siloxane copolymer may be present in an amount of from 75 mol % to 98 mol %, or at least, equal to, and/or between 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, and 98 mol %. The carbonate monomers used to form the polycarbonate may include phosgene, dimethylcarbonate and/or diphenylcarbonate. In particular embodiments, one of the aromatic dihydroxy comonomer used for making the polycarbonate-siloxane copolymer is a bisphenol-A. Comonomers that may be used include those described in U.S. Pat. No. 7,365,124, which is incorporated herein by reference for such purpose. These include but are not limited to 2,4'-dihydroxydiphenylmethane, bis(2-hydroxyphenyl)methane, bis(4-hydroxyphenyl)methane, bis (4-hydroxy-5-nitrophenyl)methane, bis(4-hydroxy-2,6-dimethyl-3-methoxyphenyl)methane, 1,1-bis(4-hydroxyphenyl) ethane, 1,1-bis(4-hydroxy-2-chlorophenyl)ethane, 2,2-bis (4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2;2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5- dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'-methylphenyl) cyclohexane (DMBPC), 1,1-bis(3,5-dimethyl-4-hydroxyphenyl)cyclohexane; 4,4'-[1-methyl-4-(1-methyl-ethyl)-1,3-cyclohexanediol]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a, 10b diphenylcoumarano-2',3',2,3-coumarane (DCBP), 2-phenyl-3,3-bis(4-hydroxyphenyl)phthalimidine, 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1, 1-bis(4-hydroxy-2,3,5,6-tetramethylphenyl)cyclohexane; 1,1-bis(2,6-dichloro-3,5-dimethyl-4-hydroxyphenyl)cyclohexane; hydroxyphenyl)cyclohexane; 1,1-bis(2,6-dibromo-3,5-dimethyl-4-1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, 1,4-bis(2-(4-hydroxy-3-methylphenyl)-2-propyl)benzenedihydroxydiphenylsulfone (BPS), 2,4'-dihydroxyphenyl sulfone, 4,4'-bis(4-hydroxyphenyl)methane, 2,6-dihydroxynaphthalene; hydroquinone; resorcinol, C1-C3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol. The most typical aromatic dihydroxy compound is Bisphenol A (BPA).

In some embodiments, an isosorbide comonomer or 2-hydrocarbyl-3,3-bis(4-hydroxyaryl)phthalimidine comonomer can be used with BPA to produce polycarbonate copolymers.

The copolycarbonates may have an average molecular weight (Mw) of from 3000 to approximately 150,000.

The siloxane is present in the polycarbonate-siloxane copolymer additive in an amount of from 2 mol % to 25 mol %, or at least, equal to, and/or between 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, and 25 mol %. The siloxane of the polycarbonate-siloxane copolymer may be a eugenol end-capped siloxane in particular embodiments. In further embodiments, the siloxane of the polycarbonate-siloxane copolymer may be composed of a chain of siloxane units composed of those siloxane D-units having the formula $(R)_2SiO$ unit where R is a $C_1$ to $C_4$ alkane. The chain length of the siloxane repeating D units may range from 5 to 65 units or at least, equal to, and/or between 5, 6, 7, 8, 9, 10, 15, 20, 25, 30, 35, 40, 45, 50, 55, and 65 units.

In certain embodiments, the polymer blend of HDPE incorporating the polycarbonate-siloxane copolymer additive may also contain a polycarbonate homopolymer. The polycarbonate homopolymers may be present in an amount of from 0.1 wt. % to 40 wt. % by total weight of the polymer blend or at least, equal to, and/or between any two of 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.5 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, and 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, and 40 wt. % by total weight of the polymer blend.

The carbonate monomers used to form the polycarbonate homopolymer may be the same as used for the polycarbonate component of the polycarbonate-siloxane copolymer, as has been previously described. These may include phosgene, dimethylcarbonate and/or diphenylcarbonate. In particular embodiments, the polycarbonate segment of the polycarbonate-siloxane copolymer is based on bisphenol-A polycarbonate.

The HDPE component, as described above, may also be used as a polymer blend in combination with PEG as a primary additive. The PEG may be used as a primary additive alone or in combination with one or more of the other primary additives. In other embodiments, one or more of the other primary additives are used with no PEG being used. The PEG and its incorporation as a polymer blend with the HDPE component may the same or similar to that described in U.S. Patent Application No. 62/681,362, filed Jun. 6, 2018, which is incorporated herein by reference for all purposes.

To impart the desired ESCR characteristics of the final product, the PEG may be used in an amount of from 1 wt. % or less by total weight of the polymer blend or at least, equal to, and/or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.10 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.20 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.30 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.40 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.50 wt. %, 0.55 wt. %, 0.60 wt. %, 0.65 wt. %, 0.70 wt. %, 0.75 wt. %, 0.80 wt. %, 0.85 wt. %, 0.90 wt. %, 0.95 wt. %, and 1.0 wt. % by total weight of the polymer blend. In particular embodiments, the PEG additive may be present in the polymer blend in an amount of from 0.01 wt. % to 0.6 wt. %. by total weight of the polymer blend.

The PEG component additive used in the polymer blend is a high molecular weight PEG. The PEG may have an average molecular weight (Mw) of from 2000 to 40,000 or at least, equal to, and/or between any two average molecular weights (Mw) of 2000, 3000, 4000, 5000, 6000, 7000, 8000, 9000, 10,000, 11,000, 12,000, 13,000, 14,000, 15,000, 16,000, 17,000, 18,000, 19,000, 20,000, 21,000, 22,000, 23,000, 24,000, 25,000, 26,000, 27,000, 28,000, 29,000, 30,000, 31,000, 32,000, 33,000, 34,000, 35,000, 36,000, 37,000, 38,000, 39,000, and 40,000. In certain embodiments, the average Mw of the PEG is from 4,000 to 20,000, 30,000, or 40,000.

The HDPE component, as described above, may also be used as a polymer blend in combination with the primary additive of a random block copolymer comprising two different saturated alkane blocks between two aromatic hydrocarbon blocks, alone or in combination with one or more of the other primary additives. In other embodiments, one or more of the other primary additives are used with no random block copolymer comprising two different saturated alkane blocks between two aromatic hydrocarbon blocks being used. The random block copolymer and its incorporation as a polymer blend with the HDPE component may the same or similar to that described in U.S. Patent Application No. 62/662,396, filed Apr. 25, 2018, which is incorporated herein by reference for all purposes.

To impart the desired ESCR characteristics of the final product, the random block copolymer may be used in an amount of from 1 wt. % or less by total weight of the polymer blend or at least, equal to, and/or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.10 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.20 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.30 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.40 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.50 wt. %, 0.55 wt. %, 0.60 wt. %, 0.65 wt. %, 0.70 wt. %, 0.75 wt. %, 0.80 wt. %, 0.85 wt. %, 0.90 wt. %, 0.95 wt. %, and 1.0 wt. % by total weight of the polymer blend. In particular embodiments, the random block copolymer additive may be present in the polymer blend in an amount of from 0.01 wt. % to 0.5 wt. %. by total weight of the polymer blend.

The random block copolymer can be any random block copolymer that has two different saturated alkane blocks positioned between aromatic blocks (e.g., two aromatic blocks). The random block copolymer can be a random ternary block copolymer. A general formula of the random block copolymer can be A-B-C-A where A is aromatic repeating units, block B is a saturated branched alkane repeating unit, and block C is a saturated linear alkane repeating unit. Non-limiting examples of Block A aromatic groups include styrenic or substituted styrenic units. Block B can be a branched saturated alkane unit having 4 to 8 carbon atoms. The branches can include 1 to 2 alkyl groups. Non-limiting examples of block B saturated alkane repeating units includes 1-methyl propane, 2-methyl butane, 2-propyl butane, 2-methyl pentane, 3-methyl pentane, 2,3-dimethyl pentane, 2-propyl pentane, 2-methyl hexane, 2-propyl hexane, 2-methyl heptane, and the like. Block C can be a linear saturated alkane repeating unit having 3 to 8 carbon atoms. Non-limiting examples of block C linear saturated alkanes repeating units includes propane, butane, pentane, hexane, heptane, and octane alkanes.

The random block copolymer can have an average molecular weight of from 250,000 to 450,000 (e.g., 250,000; 275,000; 300,000; 325,000; 375,000; 400,000; 425,000; 450,000 or any range or value there between) as per polystyrene standard and a polydispersity index (PDI=Mw/Mn) of 0.9 to 1.2, as determined by gel permeation chromatography. Polystyrene standards include monodispersed polystyrene standards with defined molecular weights that are used to calibrate while determining the molecular weight of new samples.

Random block copolymers can be obtained through commercial sources. For example, suitable random block copolymers are sold by Kuraray (Japan) under the trademarks SEPTON® 4033, 4044, 4055, 4077 and 4099. A non-limiting structure for the random block copolymer is shown in Equation (1) below:

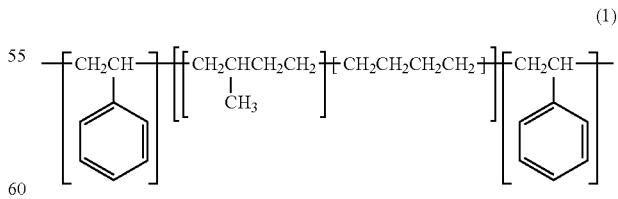

The polyethylene compositions can further include at least one additional optional or secondary additive, as distinguished from the primary additives discussed above. Such optional or secondary additives may be those that do not necessarily impact or increase the ESCR of the final product. Non-limiting examples of additional optional or secondary additives include a nucleating agent, a heat conductive agent, a tie agent, an antiblocking agent, an antistatic agent, an antioxidant, a neutralizing agent, an acid scavenger, a blowing agent, a crystallization aid, a dye, a flame retardant agent, a filler (hard or soft), an impact modifier, a mold release agent, an oil, another polymer, a pigment, a processing agent, a reinforcing agent, a stabilizer (including light stabilizers), an UV resistance agent, a clarifying agent, a slip agent, a flow modifying agent, and combinations thereof. In certain embodiments, no carbon black is present in the HDPE composition.

Non-limiting examples of nucleating agents include calcium carbonate ($CaCO_3$), barium sulfate ($BaSO_4$), silica ($SiO_2$), kaolin, talc, mica, titania ($TiO_2$), alumina ($Al_2O_3$), a zeolite, mono-or polycarboxylic aromatic acid, a dye, a pigment, metal carboxylates, metal aromatic carboxylate, hexahydrophthalic acid metal salts, stearates, organic phosphates, bisamides, sorbitols, or a combination thereof. A non-limiting example of metal aromatic carboxylate includes sodium benzoate.

In some instances, a heat conductive additive is present in the polymer blend in an amount of at least, equal to, and/or between any two of 0.01 wt. %, 0.2 wt. %, 0.3 wt. %, 0.4 wt. %, 0.5 wt. %, 0.6 wt. %, 0.7 wt %, 0.8 wt. %, 0.9 wt. %, and 1.0 wt. % by total weight of the polymer blend. Non-limiting examples of heat conductive additive include, aluminum oxide, titanium dioxide, graphitic compounds, graphenes, boron nitride, aluminum nitride, zinc oxide In certain aspects, a tie molecule is present in the polymer blend in amount of at least, equal to, and/or between any two of 0.01 wt. %, 0.2 wt. %, 0.3 wt. %, 0.4 wt. %, 0.5 wt. %, 0.6 wt., 0.7 wt. %, 0.8 wt. %, 0.9 wt. %, and 1.0 wt. % by total weight of the polymer blend. Non-limiting examples of tie molecules include, linear low density polyethylene, low density polyethylene, medium density polyethylene.

In some embodiments, a filler is present in the polymer blend in amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 2.0 wt. %, 3.0 wt. %, 4.0 wt. %, 5.0 wt. %, 6.0 wt. %, 7.0 wt. %, 8.0 wt. %, 9.0 wt. %, 10.0 wt. %, 20.0 wt. %, 30.0 wt. % by total weight of the polymer blend. The filler can be a hard filler. Non-limiting examples of hard filler include, inorganic particulate fillers such as silica, calcium carbonate, inorganic layered fillers such as clays, mica. The filler can be a soft filler. Non-limiting examples of soft filler include, immiscible particulate elastomeric/polymeric resins. The filler can also be a hollow filler. Non-limiting examples of hollow filler include, glass microspheres, plastic microspheres, ceramic microspheres such as cenospheres made up of alumino silicate microspheres, metallic microspheres made up of aluminum and copper/silver microspheres, phenolic microspheres.

In certain aspects, a light stabilizer is present in the polymer blend in an amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1.0 wt. % by total weight of the polymer blend. The light stabilizer can be a hindered amine light stabilizer. The term "hindered amine light stabilizer" refers to a class of amine compounds having certain light stabilizing properties. Non-limiting examples, of hindered amine light stabilizers (HALS) include 1-cyclohexyloxy-2,2,6,6-tetramethyl-4-octadecylaminopiperidine; bis(2,2,6,6-tetramethylpiperidin-4-yl) sebacate; bis(1-acetoxy-2,2,6,6-tetramethylpiperidin-4-yl) sebacate; bis(1,2,2,6,6-pentamethylpiperidin-4-yl) sebacate; bis(1-cyclohexyloxy-2,2,6,6-tetramethylpiperidin-4-yl) sebacate; bis(1-octyloxy-2,2,6,6-tetramethylpiperidin-4-yl) sebacate; bis(1-acyl-2,2,6,6-tetramethylpiperidin-4-yl) sebacate; bis(1,2,2,6,6-pentamethyl-4-piperidyl) n-butyl-3,5-di-tert-butyl-4-hydroxybenzyl malonate; 2,4-bis[(I-cyclohexyloxy-2,2,6,6-tetramethylpiperidin-4-yl)butylamino]-6-(2-hydroxyethyl amino-s-triazine; bis(1-cyclohexyloxy-2,2,6,6-tetramethylpiperidin-4-yl) adipate; 2,4-bis[(1-cyclohexyloxy-2,2,6,6-piperidin-4-yl)butylamino]-6-chloro-s-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methyl propoxy)-4-octadecanoyloxy-2,2,6,6-tetramethyl piperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl) adipate; 2,4-bis{N-[1-(2-hydroxy-2-methyl propoxy)-2,2,6,6-tetramethylpiperidin-4-yl]-N-butylamino}-6-(2-hydroxyethylamino)-s-triazine; 4-benzoyl-2,2,6,6-tetramethylpiperidine; di-(1,2,2,6,6-pentamethylpiperidin-4-yl) p-methoxybenzylidenemalonate; 2,2,6,6-tetramethylpiperidin-4-yl octadecanoate; bis(1-octyloxy-2,2,6,6-tetramethylpiperidyl) succinate; 1,2,2,6,6-pentamethyl-4-aminopiperidine; 2-undecyl-7,7,9,9-tetramethyl-1-oxa-3,8-diaza-4-oxo-spiro[4,5]decane; tris(2,2,6,6-tetramethyl-4-piperidyl) nitrilotriacetate; tris(2-hydroxy-3-(amino-(2,2,6,6-tetramethylpiperidin-4-yl)propyl) nitrilotriacetate; tetrakis(2,2,6,6-tetramethyl-4-piperidyl)-1,2,3,4-butane-tetracarboxylate; tetrakis(1,2,2,6,6-pentamethyl-4-piperidyl)-1,2,3,4-butane-tetracarboxylate; 1,1'-(1,2-ethanediyl)-bis(3,3,5,5-tetramethylpiperazinone); 3-n-octyl-7,7,9,9-tetramethyl-1,3,8-triazaspiro[4.5]decan-2,4-dione; 8-acetyl-3-dodecyl-7,7,9,9-tetramethyl-1,3,8-triazaspiro[4.5]decane-2,4-dione; 3-dodecyl-1-(2,2,6,6-tetramethyl-4-piperidyl)pyrrolidin-2,5-dione; 3-dodecyl-1-(1,2,2,6,6-pentamethyl-4-piperidyl)pyrrolidine-2,5-dione; N,N'-bis-formyl-N,N'-bis(2,2,6,6-tetramethyl-4-piperidyl) hexamethylenediamine; reaction product of 2,4-bis[(1-cyclohexyloxy-2,2,6,6-piperidin-4-yl)butylamino]-6-chloro-s-triazine with N,N'-bis(3-aminopropyl)ethylenediamine); condensate of 1-(2-hydroxyethyl)-2,2,6,6-tetramethyl-4-hydroxypiperidine and succinic acid; condensate of N,N'-bis (2,2,6,6-tetramethyl-4-piperidyl)-hexamethylenediamine and 4-tert-octylamino-2,6-dichloro-1,3,5-triazine; condensate of N,N'-bis(2,2,6,6-tetramethyl-4-piperidyl)-hexamethylenediamine and 4-cyclohexylamino-2,6-dichloro-1,3,5-triazine; condensate of N,N'-bis-(2,2,6,6-tetramethyl-4-piperidyl)hexamethylenediamine and 4-morpholino-2,6-dichloro-1,3,5-triazine; condensate of N,N'-bis-(1,2,2,6,6-pentamethyl-4-piperidyl)hexamethylenediamine and 4-morpholino-2,6-dichloro-1,3,5-triazine; condensate of 2-chloro-4,6-bis(4-n-butylamino-2,2,6,6-tetramethyl piperidyl)-1,3,5-triazine and 1,2-bis(3-aminopropylamino)ethane; condensate of 2-chloro-4,6-di-(4-n-butylamino-1,2,2,6,6-pentamethylpiperidyl)-1,3,5-triazine and 1,2-bis-(3-aminopropylamino)ethane; a reaction product of 7,7,9,9-tetramethyl-2-cycloundecyl-1-oxa-3,8-diaza-4-oxospiro[4,5]decane and epichlorohydrin; poly[methyl, (3-oxy-(2,2,6,6-tetramethylpiperidin-4-yl)propyl)]siloxane, CAS #182635-99-0; reaction product of maleic acid anhydride-C18-C22-α-olefin-copolymer with 2,2,6,6-tetramethyl-4-aminopiperidine; oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; oligomeric condensate of 4,4'-hexamethylenebis (amino-1,2,2,6,6-pentaamethylpiperidine) and 2,4-dichloro-6-[(1,2,2,6,6-pentaamethylpiperidin-4-yl)butylamino]-s- triazine end-capped with 2-chloro-4,6-bis(dibutylamino)-s-triazine; oligomeric condensate of 4,4'-hexamethylenebis(amino-1-propoxy-2,2,6,6-tetramethyl piperidine) and 2,4-dichloro-6-[(1-propoxy-2,2,6,6-tetramethylpiperidin-4-yl) butylamino]-s-triazine end-capped with 2-chloro-4,6-bis (dibutylamino)-s-triazine; oligomeric condensate of 4,4'-hexamethylenebis(amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine; and product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine. Also included are the sterically hindered N—H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds. Non-limiting examples of commercial light stabilizer are available from BASF under the trade name Uvinul® 4050H, 4077H, 4092H, 5062H, 5050H, 4092H, 4077H, 3026, 3027, 3028, 3029, 3033P, and 3034 or Tinuvin® 622.

Anti-static agents can be used to inhibit accumulation of dust on plastic articles. Antistatic agents can improve the electrical conductivity of the plastic compositions, and thus dissipate any surface charges, which develop during production and use. Thus, dust particles are less attracted to the surface of the plastic article, and dust accumulation is consequently reduced. In certain aspects of the present invention, the antistatic agent can be a glycerol monostearate. The polymer blend can include an anti-static agent in an amount of at least, equal to, and/or between any two 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % by total weight of the polymer blend.

A lubricant can be added to a polymer blend to improve the mold-making characteristics. The lubricant can be a low molecular compound from a group of fatty acids, fatty acid esters, wax ester, fatty alcohol ester, amide waxes, metal carboxylate, montanic acids, montanic acid ester, or such high molecular compounds, as paraffins or polyethylene waxes. In certain aspects of the present invention, the lubricant is a metal stearate. Non-limiting examples of metal stearates include zinc stearate, calcium stearate, lithium stearate or a combination thereof, preferably calcium stearate. The polymer blend can include a lubricant in an amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % by total weight of the polymer blend.

An antioxidant can provide protection against polymer degradation during processing. Phosphites are known thermal oxidative stabilizing agents for polymers and other organic materials. The antioxidant can be a phosphite-based antioxidant. In certain aspects phosphite-antioxidants include, but are not limited to, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tertbutylphenyl)-4,4'-biphenylene diphosphonite, bis(2,4-dicumylphenyl)pentaerythritol diphosphite. The polymer blend can include an antioxidant in an amount of at least, equal to, and/or between any two of 0.01 wt. %, 02 wt. %, 0.3 wt. %, 0.4 wt. %, 0.5 wt. %, 0.6 wt. %, 0.7 wt. %, 0.8 wt. %, 0.9 wt. %, and 0.1 wt. % by total weight of the polymer blend. Non-limiting examples of commercially available antioxidants include Irganox 1010 available from BASF, or Doverphos S9228T available from Dover Chemical Company.

In forming the composition, the various components of the HDPE and the primary additives described, which may be in the form of pellets, powder, flakes or fluff, along with any additional optional additives, can be dry blended. These materials combined in a customary mixing machine, in which the HDPE and primary additives are mixed with the optional additional or secondary additives. The optional additional additives can be added at the end or during the processing steps to produce the polymer blend. Suitable machines for such mixing are known to those skilled in the art. Non-limiting examples include mixers, kneaders and extruders. These materials are then fed directly into the feed zone of an extruder. In certain cases, the process can be carried out in an extruder and introduction of the additives may occur during processing. Non-limiting examples of suitable extruders include single-screw extruders, counter-rotating and co-rotating twin-screw extruders, planetary-gear extruders, ring extruders, or co-kneaders. The process can be performed at a temperature from 160° C. to 300° C.

In some embodiments, the HDPE and primary additives, and any optional secondary additives, used to produce the polymer blend of the present invention can be melt-extruded by following typical procedures of weighing the required amounts of the HDPE and additives, followed by dry blending, and then feeding the mixture into a main feeder of a twin-screw co-rotating extruder (length/diameter (L/D) ratio of 25:1 or 40:1) to obtain the final composition. The HDPE, additives, or blend thereof can be subjected to an elevated temperature for a sufficient period of time during blending. The blending temperature can be above the softening point of the polymers. In certain aspects, the extrusion process can be performed at a temperature from 160° C. to 300° C. The primary additives can be added along with other optional additives in-line and prior to pelletization of the HDPE resin during the production process. The amounts of additives combined with the HDPE can be adjusted to provide those weight amounts previously discussed.

The optional secondary additives can be premixed or added individually to the polymer blend or the different components thereof. By way of example, the secondary additives of the present invention can be premixed such that the blend is formed prior to adding it to the HDPE or the primary additives. The blend thereof can be subjected to an elevated temperature for a sufficient period of time during blending and/or incorporation of additives. Incorporation of optional secondary additives into the polymer resin can be carried out, for example, by mixing the above-described components using methods customary in process technology. The blending temperature can be above the softening point of the polymers. In certain aspects, a process can be performed at a temperature from 160° C. to 300° C. Such "melt mixing" or "melt compounding" results in uniform dispersion of the present optional additives in the HDPE and/or primary additives.

Articles (e.g., caps) that are manufactured from the blend of HDPE and primary additives can have a higher ESCR than articles of manufacture made from HDPE without such additives (i.e., the HDPE used to prepare the blend). In some embodiments, the articles of manufacture of the present invention have an ESCR that is 200% to 2000% greater than the ESCR values of HDPE articles of manufacture with the same configuration using the same HDPE without the use of the primary additives. The ESCR values can be at least, equal to, and/or between any two of 200%, 300%, 400%, 500%, 600%, 700%, 800%, 900%, 1000% and 2000% greater than the ESCR HDPE values without the use of the primary additives. As exemplified in the Examples section and throughout the specification, polymer blend containing articles of manufacture of the present invention can have an ESCR values from at least 20 hours to 2000 hours (e.g., 20, 30, 40, 50, 60, 70, 80, 90, 100, 110, 120, 130, 140, 150, 160, 170, 180, 190, 200, 300, 400, 500, 600, 700, 800, 900, 1000, and 2000 and any range or value there between and including the endpoints). In contrast HDPE articles of manufacture without the primary additives, can have an ESCR values of less than but not equal to 20 hours.

The polymer blend compositions formed as described are normally collected as pellets, which can be stored for a time or employed immediately in a forming process. The forming processes can include injection molding, blow molding, compression molding, sheet extrusion, film blowing, pipe extrusion, profile extrusion, calendaring, thermoforming, rotomolding, or combinations thereof. The final formed articles can be, for instance, molded parts, sheets, films, or fibers. Examples of molded parts include a cap, a bottle cap, a container, a lid, a sheet, a pipe, a pipe coupling, a bottle, a cup, a tray, a pallet, or a toy, or combinations thereof. Caps can be injection and/or compression molded. The caps may be threaded or non-threaded caps for selectively closing off openings to bottles or other containers. Such caps can be used in a variety of food and non-food applications. By way of example, caps that include the polymer blend of the present invention can be used with containers for storing carbonated beverages, pressurized beverages, or the like.

The following examples serve to further illustrate various embodiments and applications.

Example 1

Different primary additives were used for improving the ESCR performance of multimodal HDPEs (HDPE-1 & HDPE-2), with melt flow rate at 190° C. and with 2.16 Kg load in the range of 0.6-0.8 dg/min as per ISO 1133 method, density in the range of 953-955 Kg/m$^3$ as per ASTM D1505 or ISO 1872 method, a tensile modulus in the range of of 1100-1200 MPa as per ISO 527-2 method, a tensile strength @yield in the range of 20-28 MPa as per ISO 527 1&2 method, an izod notched impact at 23° C. in the range of 8-12 KJ/m$^2$ as per ISO 180/A method and a Charpy impact strength at 23° C. in the range of 8-10 KJ/m$^2$ as per ISO 179 method.

HDPE-1 and HDPE-2 used included SABIC® experimental grade multimodal HDPE and INEOS CAP 602 multimodal HDPE. The primary additives included a hydrogenated styrenic block copolymer of a styrene-ethylene-ethylene-propylene-styrene (SEEPS), available as Septon™ from Kuraray America, Inc., styrene-isoprene-styrene (SIS), available as Kraton D™ from Kraton Polymers, polycarbonate-siloxane copolymer, available as Lexan™ resin from SABIC, high molecular weight polyethylene oxide, available as Polyglykol® 20000 S from Clariant, and ionomeric ethylene copolymers, available as Surlyn® ionomer resin from E. I. du Pont de Nemours and Company. The multimodal HDPE used was formulated with the primary additives in a total amount of from 0.1 wt. % to 0.5 wt %, either individually or as a mixture of above primary additives, both with and without other optional additives. The additives were dry-mixed with multimodal HDPE pellets in a plastic bag. For comparison purposes, neat multimodal HDPE without any primary additives added was also tested. The different mixtures were fed into a hopper of a ZSK-25 mm 6 barrel twin-screw extruder with an L/D ratio of 25:1. The operating parameters used are set forth in Table 1 below:

TABLE 1

| | |
|---|---|
| Barrel-1 (Attached with Hopper) | Temp. = 160° C. |
| Barrel-2 | Temp. = 185° C. |
| Barrel-3 | Temp. = 195° C. |
| Barrel-4 | Temp. = 195° C. |
| Barrel-5 | Temp. = 200° C. |
| Barrel-6 (Die) | Temp. = 210° C. |
| Screw Speed | 250 rpm |
| Feed Rate | 8 kg/hr |
| Batch Size | 1000 g |

The torque measured during the melt extrusion of the neat and formulated HDPE with the additives was in the range of 33-40%, indicating that the processability of HDPE was not hampered significantly with the addition of the ESCR enhancing primary additives.

Example 2

The pellets obtained after the melt extrusion of Example 1 were compression molded into 1.85 mm to 1.95 mm thick sheets at a temperature of 195° C. to 210° C., with a holding time of 5 min and a cooling time of 5 min. No visual inhomogeneity was evident in the compression molded sheets. The compression molded sheets, both the neat and formulated HDPE, were then evaluated for ESCR performance according to ASTM D1693-15B method (Bell Test).

The compression molded sheets were cut into test specimens having a length of 38 mm and width of 13 mm. A notch of 0.5 mm depth was created at the center of each test specimen prior to storing it in a conditioned environment of 23° C. and humidity of 55% RH. The conditioned specimens were U-bent with the aid of a jig. Ten of the bent specimens for each neat and formulated HDPE materials were placed in an aluminum sample holder and subsequently placed inside a test tube filled with 10% v/v aqueous solution of Igepol CO-630 (nonylphenoxy poly(ethyleneoxy) ethanol, CAS 68412-54-4). The mouth of the test tube was closed with a rubber cork wrapped with an aluminum foil. The test specimens placed in the test tube filled with Igepol CO-630 aqueous solution were immersed in a silicone oil bath maintained at 50° C. The time it took to observe the formation of cracks in the test specimens were regularly noted. The time taken for 50% of the specimens (i.e., 5 out of the 10 specimens) to fail (i.e., crack) were reported to infer the ESCR performance of the given composition.

The ESCR performance of the neat multimodal HDPE and formulated multimodal HDPE incorporating the additives is presented in Table 2 below:

TABLE 2

| Composition | Type | Time to 50% Fail (h) |
|---|---|---|
| Neat HDPE-1 | Comparative Sample 1 | 150 |
| Neat HDPE-2 | Comparative Sample 2 | 470 |
| HDPE-1 + 0.25 wt. % of Septon-4099 + 0.25 wt. % of PEG-20000 | Working Sample 1 | 360 |
| HDPE-1 + 0.5 wt % of PEG-2000 | Working | 400 |

TABLE 2-continued

| Composition | Type | Time to 50% Fail (h) |
|---|---|---|
| HDPE-2 + 0.25 wt. % of Septon-4099 + 0.25 wt. % of PEG-20000 | Working Sample 3 | 910 |
| HDPE-2 + 0.5 wt. % of PEG-20000 | Working sample 4 | 1150 |
| HDPE-2 + 0.5 wt % of Septon-4099 | Working sample 5 | 700 |
| HDPE-2 + 0.5 wt % of polycarbonate-siloxane copolymer | Working sample 6 | 850 |

As can be seen from Table 2, the observed time for 50% of the samples to fail for neat HDPE-1 and HDPE-2 was ~150 and ~470 h, respectively. A 2-3 fold increase of time for 50% of the specimens to fail was found for those multimodal HDPE compositions incorporating ~0.5 wt % of individual or a mixture of primary additives.

Melt mass flow rates (MFR) of multimodal HDPE-1 resin (Comparative Sample-1) measured at 190° C. with a load of 2.16, 5 and 21.6 Kg by ISO 1133-1:2011 method were ~0.8, ~ 2.8 and ~45 dg/min, respectively. In comparison, the melt mass flow rates (MFR) of multimodal HDPE-1 resin incorporated with a mixture of additives (working sample-1) measured at 190° C. with a load of 2.16, 5 and 21.6 Kg by ISO 1133-1:2011 method were ~0.8, ~ 2.3 and ~47 dg/min, respectively. These results indicate that the melt viscosity/flow characteristics of the HDPE mostly remained unaffected with the incorporation of small quantities of mixture of additives. Similarly, the melt mass flow rates (MFR) of multimodal HDPE-2 resin (Comparative Sample-2) measured at 190° C. with a load of 2.16, 5 and 21.6 Kg by ISO 1133-1:2011 method were ~0.7, ~ 2.6 and ~40 dg/min, respectively. In comparison, the melt mass flow rates (MFR) of multimodal HDPE-2 resin incorporated with a mixture of additives (working sample-3) measured at 190° C. with a load of 2.16, 5 and 21.6 Kg by ISO 1133-1:2011 method were ~0.7, 2.5 and ~39 dg/min, respectively. These results indicate that the melt viscosity/flow characteristics of the HDPE mostly remained unaffected with the incorporation of small quantities of individual or of mixture of primary additives.

The mechanical properties of HDPE-2 such as notched izod impact of ~145 KJ/m$^2$, notched Charpy impact of ~17 KJ/m$^2$, tensile modulus of ~900 MPa and stress at yield of 22 MPa were mostly remained unaffected with the incorporation of small quantities of individual or of mixture of primary additives. Similarly, the strain hardening modulus of neat HDPE-2 of ~17 MPa was also mostly remained unaffected with the incorporation of small quantities of individual or of mixture of primary additives.

The invention claimed is:

1. A polyethylene composition having increased environmental stress crack resistance, the composition comprising a polymer blend of a multimodal high density polyethylene (HDPE) and an additive of a polycarbonate-siloxane copolymer and optionally at least one of a polyethylene glycol (PEG) having weight average molecular weight (Mw) of at least 2000, and a random block copolymer comprising two different saturated alkane blocks between two aromatic hydrocarbon blocks, the additive being present in the polymer blend in an amount of 0.1 to 0.9 wt. % by weight of the polymer blend.

2. The composition of claim 1, wherein the additive comprises the polycarbonate-siloxane copolymer, and at least one of a polyethylene glycol (PEG), and a random block copolymer comprising two different saturated alkane blocks between two aromatic hydrocarbon blocks.

3. The composition of claim 1, wherein the additive is present in an amount of from 0.1 wt. % to 0.5 wt. % by weight of the polymer blend, by weight of the polymer blend.

4. The composition of claim 1, wherein the HDPE has at least one of the following:
a melt flow rate at 190° C. and 2.16 kg of from 0.3 to 6.0;
a melt flow rate at 190° C. and 21.6 kg of 3 dg/min to 70 dg/min; and
a density of 945 kg/m$^3$ to 965 kg/m$^3$
wherein the melt flow ration is determined in accordance with ISO 1133-1 (2011), and the density in accordance with ASTM D792 (2013).

5. The composition of claim 1, wherein the HDPE has a dispersity index (PDI=Mw/Mn) of from 8 to 30 as determined by high temperature gel permeation chromatography.

6. The composition of claim 1, wherein the HDPE is a copolymer with comonomers selected from $C_3$ to $C_{10}$ olefin monomers, the comonomers being present in the HDPE copolymer in an amount of from 2 wt. % or less.

7. The composition of claim 1, wherein the polymer blend provides a molded article having an ESCR of at least 40 hours as determined by ASTM D1693-15B.

8. The composition of claim 1, wherein the polymer blend provides a molded article having an ESCR of from 30 hours to 1000 hours as determined by ASTM D1693-15B.

9. The composition of claim 1, wherein the additive is a polycarbonate-siloxane copolymer having at least one of the following:
weight average molecular weight (Mw) of from 10,000 to 60,000;
a polycarbonate component that comprises a bisphenol-A polycarbonate;
the polycarbonate-siloxane copolymer is a bisphenol-A and eugenol end-capped siloxane copolymer; and
the siloxane of the polycarbonate-siloxane copolymer has a chain length of from 5 to 65 siloxane repeating units.

10. The composition of claim 1, wherein the additive is polyethylene glycol (PEG) having at least one of the following:
weight average molecular weight (Mw) of from 2,000 to 40,000; and
weight average molecular weight (Mw) of from 5000 to 20,000.

11. The composition of claim 1, wherein the additive comprises the polycarbonate-siloxane copolymer and the random block copolymer comprising two different saturated alkane blocks between two aromatic hydrocarbon blocks having at least one of the following:
at least one of the two different saturated alkane blocks is branched;
the random block copolymer is a styrenic-(2-methyl butane)-butane-styrenic random block copolymer;
the random block copolymer has a dispersity index (PDI=Mw/Mn) of from 0.9 to 1.2 as determined by gel permeation chromatography; and
the random block copolymer is a hydrogenated styrene-isoprene-butane block polymer.

12. The composition of claim 1, further comprising an additional additive of at least one of a nucleating agent, a heat conductive agent, a tie agent, an antiblocking agent, an antistatic agent, an antioxidant, a neutralizing agent, an acid scavenger, a blowing agent, a crystallization aid, a dye, a flame retardant agent, a filler, an impact modifier, a mold release agent, an oil, another polymer, a pigment, a processing agent, a reinforcing agent, a stabilizer, an UV resistance agent, a clarifying agent, a slip agent, a flow modifying agent, ionic additive and combinations thereof.

13. The composition of claim 1, wherein the polymer blend is formed into an article of manufacture.

14. The composition of claim 13, wherein the article is formed by at least one of injection molding, blow molding, compression molding, sheet extrusion, film blowing, pipe extrusion, profile extrusion, calendaring, and thermoforming.

15. A method of forming a polyethylene composition having increased environmental stress crack resistance, the method comprising:
  modifying a multimodal high density polyethylene (HDPE) by combining the multimodal HDPE with an additive of a polycarbonate-siloxane copolymer, and optionally at least one of a polyethylene glycol (PEG) having weight average molecular weight (Mw) of at least 2000, and a random block copolymer comprising two different saturated alkane blocks between two aromatic hydrocarbon blocks, the additive being present in the polymer blend in an amount of from 0.9 wt. % or less by weight of the polymer blend.

16. The composition of claim 13, wherein the article is at least one of a film, a molded part, a container, a beverage container cap, a lid, a sheet, a pipe, a pipe coupling, a bottle, a cup, a tray, a pallet, and a toy.

* * * * *